(12) United States Patent
Giraud et al.

(10) Patent No.: US 9,323,955 B2
(45) Date of Patent: Apr. 26, 2016

(54) METHOD FOR PROTECTING A LOGIC OR MATHEMATICAL OPERATOR INSTALLED IN AN ELECTRONIC MODULE WITH A MICROPROCESSOR AS WELL AS THE ASSOCIATED EMBEDDED ELECTRONIC MODULE AND THE SYSTEM

(75) Inventors: Nicolas Giraud, Le Chesnay (FR); Abraham Brolh, Courbevoie (FR); Patrice Hameau, Boulogne Billancourt (FR)

(73) Assignee: GEMALTO SA, Meudon (FR)

(*) Notice: Subject to any disclaimer, the term of this patent is extended or adjusted under 35 U.S.C. 154(b) by 3183 days.

(21) Appl. No.: 10/471,323

(22) PCT Filed: Dec. 20, 2001

(86) PCT No.: PCT/FR01/04124
§ 371 (c)(1),
(2), (4) Date: Aug. 1, 2007

(87) PCT Pub. No.: WO02/50641
PCT Pub. Date: Jun. 27, 2002

(65) Prior Publication Data
US 2008/0016583 A1  Jan. 17, 2008

(30) Foreign Application Priority Data
Dec. 21, 2000 (FR) .................................. 00 16723

(51) Int. Cl.
G06F 21/75 (2013.01)
(52) U.S. Cl.
CPC ..................................... G06F 21/75 (2013.01)
(58) Field of Classification Search
USPC ............ 726/34–36; 380/28–30, 42, 207, 209, 380/210, 259, 264, 265, 268, 287; 708/200, 708/212
See application file for complete search history.

(56) References Cited

U.S. PATENT DOCUMENTS 4,932,053 A   6/1990  Fruhauf
5,493,240 A   2/1996  Frank
(Continued)

FOREIGN PATENT DOCUMENTS

EP   0981223 A2   2/2000
EP   1109350 A1   6/2001
(Continued)

OTHER PUBLICATIONS

PCT/FR01/04124 International Search Report, Mar. 27, 2002, European Patent Office, P.B. 5818Patentlaan 2 NL—2280 HV Rijswijk.

Primary Examiner — Hadi Armouche
Assistant Examiner — Malcolm Cribbs
(74) Attorney, Agent, or Firm — The Jansson Firm; Pehr B. Jansson

(57) ABSTRACT

The method for protecting a logic or mathematical operator of the NOR operator type, able to be used for executing a program in a microprocessor electronic module wherein the execution of the NOR operator is replaced by the execution (CAL-XORSEC(1) of a sequence Si operations having for final result a result identical to that of the XOR function.

The sequence of operations Si composed of elementary operations with AND, OR and NOT is selected at each XOR operator from a set of eight equivalent sequences (S1 to S8) after determination CAL-NDO) of an order number ND0=1 according to the parameters of the program and/or a random parameter R supplied by a pseudo-random number generator (14).

12 Claims, 2 Drawing Sheets

(56) References Cited

U.S. PATENT DOCUMENTS

| | | |
|---|---|---|
| 5,708,715 A | 1/1998 | Vicard |
| 5,764,761 A | 6/1998 | Vicard |
| 5,944,833 A | 8/1999 | Ugon |
| 6,295,606 B1 | 9/2001 | Messerges et al. |
| 6,298,442 B1* | 10/2001 | Kocher et al. ............ 713/194 |
| 6,334,189 B1* | 12/2001 | Granger et al. ............ 726/26 |
| 6,804,782 B1 | 10/2004 | Qiu et al. |
| 6,873,706 B1 | 3/2005 | Miyazaki et al. |
| 6,940,975 B1 | 9/2005 | Kawamura et al. |
| 7,092,523 B2 | 8/2006 | Pezeshki et al. |
| 2001/0048742 A1 | 12/2001 | Handschuh |
| 2002/0029346 A1 | 3/2002 | Pezeshki |
| 2003/0044003 A1 | 3/2003 | Chari et al. |
| 2003/0048903 A1 | 3/2003 | Ito et al. |
| 2003/0053576 A1* | 3/2003 | Cao ............................ 375/375 |
| 2004/0071288 A1 | 4/2004 | Romain et al. |
| 2005/0166191 A1* | 7/2005 | Kandanchatha ........ G06F 21/50 717/137 |
| 2006/0090081 A1 | 4/2006 | Baentsch et al. |

FOREIGN PATENT DOCUMENTS

| | | |
|---|---|---|
| WO | WO0041356 A1 | 7/2000 |
| WO | WO0042511 A | 7/2000 |

* cited by examiner

METHOD FOR PROTECTING A LOGIC OR MATHEMATICAL OPERATOR INSTALLED IN AN ELECTRONIC MODULE WITH A MICROPROCESSOR AS WELL AS THE ASSOCIATED EMBEDDED ELECTRONIC MODULE AND THE SYSTEM

FIELD OF THE INVENTION

The present invention concerns the protection of embedded systems comprising one or several electronic modules incorporating at least one microprocessor, a ROM type memory containing at least one program to be executed and input/output means for communicating with the outside world. Certain modules also comprise other accessory circuits, such as RAM and EEPROM memories for more elaborate applications and are also known under the name of microcontrollers.

These modules are most often embodied in the form of a monolithic electronic microcircuit or chip. These modules can be used firstly as such once physically protected and mounted for example on a portable smart card object, microcircuit card or similar element able to used in various domains, especially those relating to bank and/or commercial cards, mobile radiotelephony, paying television, health and transport, and secondly in other embedded systems ranging from relatively simple systems, such as sensors and circuit breakers, to more complex systems, such as industrial controllers, multiswitches and other sub-units and electrically controlled devices up to complete industrial systems electronically controlled.

BACKGROUND OF THE INVENTION

The multiplication of applications in the current life of smart cards and other embedded systems and the generalization of their use in certain fields, such as those relating to bank cards, health cards or pay television, has made it necessary to introduce protection procedures, such as cryptographic procedures and/or data scrambling procedures, for example the data transiting on the internal bus of the microcontroller. These protective procedures concern in particular the authentication of the user, the authentication of the transaction and its validity, the retaining of the confidentiality of the data and the encryption/decryption of said data.

Although the fraudulent use of smart cards is not a new phenomenon, the increase of the volume and value of smart card transactions has led to fraudulent persons using increasingly sophisticated means and methods. In particular, attacks by short radiations targeted on the chip have the result in modifying the data and/or the codes transiting from the ROM to the microprocessor on the internal bus which results in the non-execution or irregular execution of certain portions of the cod e, for example the execution of inoperable instructions instead of one or several protective operations.

It has been shown that the precise marking of the position of a sensitive data operation (for example relating to encryption and/or decryption) in a program encoded in a ROM memory makes it easier to target the attack and significantly increase the nuisance power of the latter. So as to carry out this localization, fraudulent persons use the SPA method (Simple Power analysis) which consists of recording the current consumption at certain points of the microcontroller. The SPA method can be completed by the DPA (Differential Power Analysis) method based on the comparative analysis of the signals. From this point of view, it happens that the execution of certain programmed operations (such as the [OR exclusive] operation frequently used in encryption/decryption) reveals a sufficiently characteristic <<signature>> to allow identification of the operation in question and accordingly its localization in the program.

SUMMARY OF THE INVENTION

The object of the present invention is to protect certain vulnerable operations inside a program, especially logic or mathematical operators or similar operational circuits rendering them difficult, even more difficult, to identify.

With this purpose in mind, the invention concerns a method for protecting a logic or mathematical operator or a similar operational circuit able to be used in the execution of a program in an electronic module with a microprocessor, wherein in said method, execution of said operator is replaced by the execution of a sequence of replacement operations whose final result is identical to the result of the function of said operator.

Thus, the highly characteristic signature of a complex operator, such as the XOR operator, is replaced by the signal of a sequence of operations, often less complex but not necessarily, such as a sequence of elementary operations of less characterized adjacent or identical signatures, the identification of the operator being therefore rendered more difficult.

According to one preferred implementation of the method of the invention, the sequence of replacement operations is selected on each call from the operator to be protected from a set of equivalent sequences. Thus, the difficulty of identification is further increased by the multiple changes of the sequence of operations replacing the operator to be protected during the execution of a given program. Advantageously, the set of sequences comprises at least four equivalent sequences and preferably eight equivalent sequences, which makes even more difficult identification of the sequence as the operator sought by fraudulent persons.

According to a first variant of the invention, the order number in its entirety of the s elected sequence is determined according to certain parameters of the current program being executed and/or a random parameter advantageously obtained from a generator of pseudo-random numbers. This scrambling mechanism for scrambling sequences proves to b e extremely effective when the operator to be protected is repeated several times in a program, as for example the XOR operator in an encryption/decryption processing.

According to a second variant of the invention (not exclusive of the first variant), the sequences of operations of a given set all have the same period of execution. Advantageously, certain sequences comprise at least one non-operative instruction intended to introduce a delay time in the execution of the sequences concerned. In particular, the non-operative sequence is selected from non-operative instructions in relation to the microprocessor or from normally operative instructions but rendered ineffective via their positions in the sequence of operations. This mechanism for making uniform the periods of execution of the sequences makes it more difficult to distinguish these sequences with respect to one another.

According to one first application of the method of the invention, the operator to be protected is by way of example a non-restrictive logic operator, such as the XOR (or OR exclusive) logic operator. Advantageously, at least one sequence of replacement operations is composed from elementary logic operators. For example, at least one sequence of operations is composed from AND, OR and NOT elementary logic operators.

As regards the processing on protecting the XOR operator, the invention also concerns the sets of sequences of replacement operations S1 to S8 and S'1 to S'8 as given below:

S1=(x OR y) AND NOT (x AND y)
S2=(x OR y) AND (NOT x OR NOT y)
S3=NOT (NOT x AND NOT y) AND NOT (x AND y)
S4=NOT (NOT x AND NOT y) AND (NOT x OR NOT y)
S5=NOT (NOT (x OR y) OR (x AND y))
S6=NOT ((NOT x AND NOT y) OR (x AND y))
S7=NOT ((NOT x AND NOT y) OR NOT (NOT x OR NOT y))
S8=NOT (NOT (x OR y) OR NOT (NOT x OR NOT y))

and with sequences of replacement operations with the same period of execution:

S'1=(x OR NOP y OR y) AND NOP NOT (x AND NOP y AND y)
S'2=(x OR y NOP OR y) AND NOP (NOT x OR NOP NOT y)
S'3=NOT (NOT x AND NOP NOT y) AND NOT (x AND y AND y)
S'4=NOT (NOT x AND NOP NOT y) AND (NOT x OR NOT y)
S'5=NOT (NOT (x NOP OR y OR y) OR (x NOP AND y AND y))
S'6=NOT ((NOT x AND NOT y NOP) OR (x AND y NOP AND y))
S'7=NOT ((NOT x AND NOT y) OR NOT (NOT x OR NOT y))
S'8=NOT (NOT (x OR y OR y) OR NOT (NOT x OR NOT y))

in which the instruction NOP corresponds to a non operative instruction in relation to the microprocessor.

According to other applications of the method of the invention, the operator to be protected is a mathematical operator, such as a one-digit adder, an adder, a subtractor or a multiplier, or a functional circuit similar to a logic or mathematical operator, such as a combinational circuit, especially a multiplexer and/or a demultiplexer, an encoder and/or decoder, a generator and/or parity detector or a comparator.

In particular, according to a second application of the method of the invention, the operator is a mathematical operator of the "multiplication by two" obtained by shifting to the left of one bit with resetting of the least significant bit, the notation at C ANSI of this operator being written (x<<1).

As regards processing protection of the operator (x<<1), the replacement sequences S"1 to S"4 following equivalents:

S"1=(x ADD x)
S"2=(x AND F0h) ADD x ADD (x AND 0Fh)
S"3=(NOT ((NOT x) ADD (NOT x))) SUB 1
S"4=(y ADD x) SUB (y SUB x), in which the ADD operator is the standard addition operator on one octet, the SUB operator being the standard subtraction operator on one octet and the suffix <<h>> indicates a hexadecimal value.

The invention also concerns an electronic module with a protected operator and comprising at least one microprocessor and a program to be executed comprising at least one logic or mathematical operator or a similar operational circuit to be protected, wherein the module comprises means for replacing the execution of the operator by the execution of a sequence of operations whose final result is identical to the result of the function of the operator.

Advantageously, the electronic module of the invention comprises means for selecting the sequence of operations on each call of the operator from a set of equivalent sequences. According to one extremely advantageous variant, the module comprises computer processing means for determining the order number concerning the sequence selected according to certain parameters of the program being executed and/or a random parameter generated by a generator of pseudo-random numbers.

The invention also concerns an electronic module with a protected operator and comprising at least one microprocessor and a program to be executed comprising at least one logic or mathematical operator or a similar circuit to be protected, wherein it comprises hardware and/or software means for implementing the method of the invention shown above.

The invention also concerns an embedded system or a microcircuit card comprising an electronic module with a protected operator as previously defined in its various variants.

BRIEF DESCRIPTION OF THE DRAWINGS

Other aims, advantages and characteristics of the invention shall appear on a reading of the following description of the implementation of the method of the invention applied to the protection of the XOR operator and an embodiment of an electronic module with a microprocessor according to the invention and given by way of non-restrictive example with reference to the accompanying drawings on which.

DETAILED DESCRIPTION OF THE PREFERRED EMBODIMENTS

Figure 1:
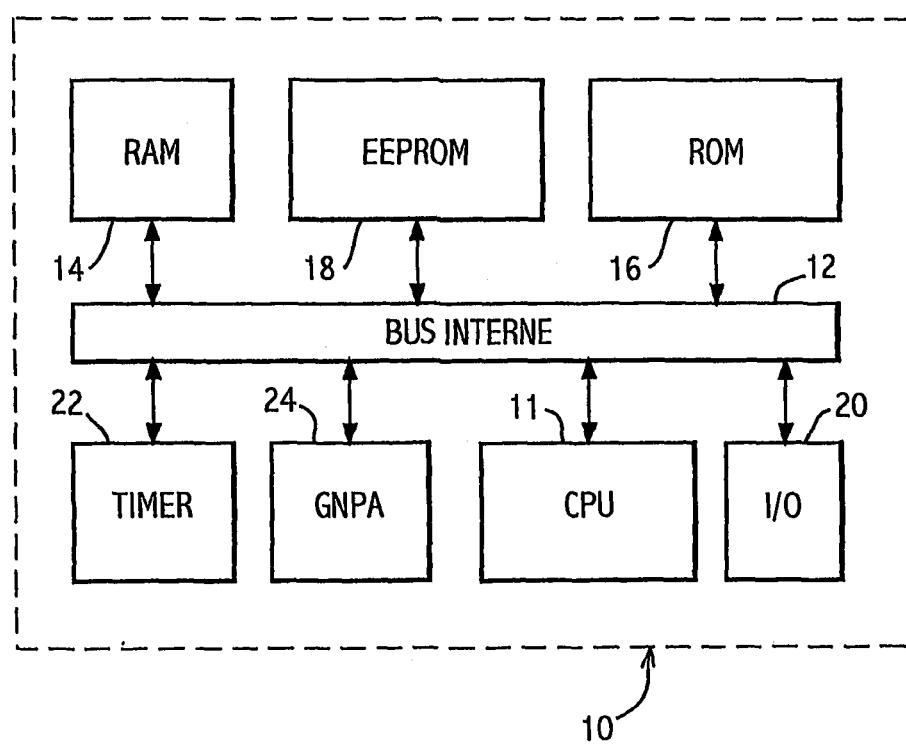
FIG. 1 shows a diagrammatic representation of an embodiment of an electronic module with a microprocessor and a protected XOR operator according to the invention.

The monolithic electronic module 10 with a microprocessor shown on FIG. 1 according to the present invention and described by way of non-restrictive example generally comprises one microprocessor or central unit CPU 11 connected bidirectionally by an internal bus 12 to a live RAM memory 14, a dead ROM memory 16, an EEPROM memory 18 and an I/O input/output interface 20. The module 10 also comprises a Timer 22 with automatic resetting (in an optional variant) and a generator of pseudo-random numbers GNPA 24 connected to the internal bus 12.

Application programs are installed at ROM 16, such as applications of bank card transactions or medical card applications which for reasons of confidentiality and protection comprise encryption/decryption, operator authentication or transaction validation sub-program in which the XOR operator is frequently present, especially for carrying out comparisons octet by octet.

As regards execution of the XOR operator, this operator most commonly used generally forms part of the set of arithmetic instructions with two operands OP1 et OP2) of the central unit CPU or microprocessor 11.

Figure 2:
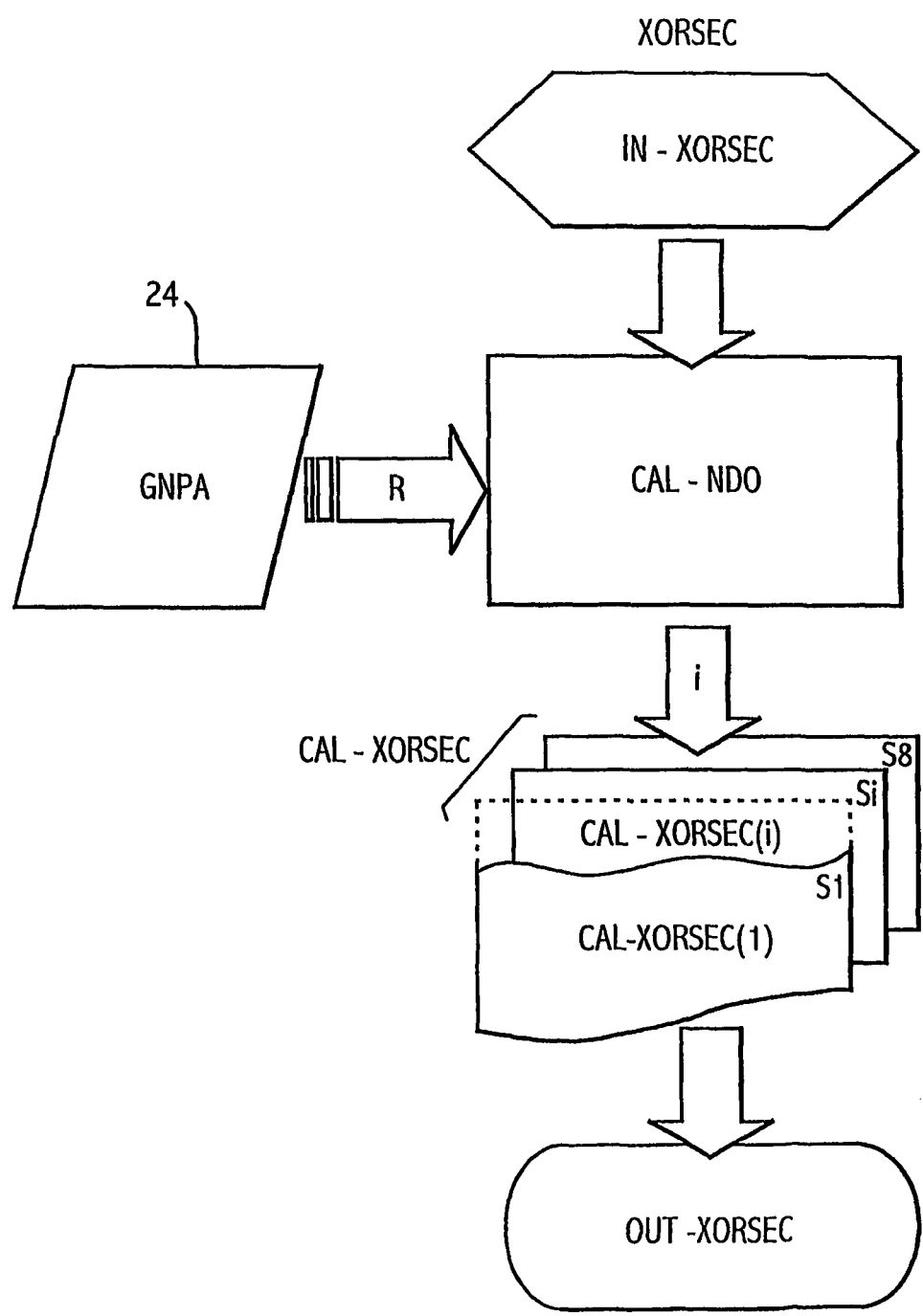
FIG. 2 shows a diagrammatic representation of the equivalent execution of the XOR operator implementing the method of the invention in the module of FIG. 1.

In the embodiment described here, the means for implementing the method for protecting the XOR operator are mainly software items in the form of a protected XOR calculation routine (or XORSEC routine) diagrammatically shown on FIG. 2. Thus, on each call for the XOR instruction (OP1, OP2) the program is rerouted with the two operands OP1 and OP2 towards the XORSEC routine which shall be executed in place of the XOR instruction, it being understood that the execution of the XORSEC routine carries out a function equivalent to that of the original XOR instruction.

According to the main characteristic of the invention, the execution of the XOR instruction is replaced in the XORSEC routine by the execution of a sequence of operations, namely of the type but not exclusively of operations with a degree of less complexity, such as elementary operations, whose final result is identical to the result of the function of the XOR operator (condition easily verified amongst others by identical outlet tables).

By way of non-restrictive examples, a set of eight sequences S1 to S8 equivalent to the XOR instruction is given below:

S1=(x OR y) AND NOT (x AND y)
S2=(x OR y) AND (NOT x OR NOT y)
S3=NOT (NOT x AND NOT y) AND NOT (x AND y)
S4=NOT (NOT x AND NOT y) AND (NOT x OR NOT y)
S5=NOT (NOT (x OR y) OR (x AND y))
S6=NOT ((NOT x AND NOT y) OR (x AND y))
S7=NOT ((NOT x AND NOT y) OR NOT (NOT x OR NOT y))
S8=NOT (NOT (x OR y) OR NOT (NOT x OR NOT y))

It shall be observed that all these sequences S1 to S8 are based on the use of at least two of three AND, NOT and OR logic elementary instructions and have the same truth table outlet as for the XOR instruction.

By using the traditional presentation of truth tables with two inlets x, y and one outlet s, it is possible to write for the XOR, AND and OR operators and for the sequence S5 (selected by way of non-restrictive example) the following four truth tables:

| XOR | | | AND | | | OR | | |
|---|---|---|---|---|---|---|---|---|
| x | y | s(XOR) | x | y | s(AND) | x | y | s(OR) |
| 0 | 0 | 0 | 0 | 0 | 0 | 0 | 0 | 0 |
| 0 | 1 | 1 | 0 | 1 | 0 | 0 | 1 | 1 |
| 1 | 0 | 1 | 1 | 0 | 0 | 1 | 0 | 1 |
| 1 | 1 | 0 | 1 | 1 | 1 | 1 | 1 | 1 | and for S5=NOT (NOT (x OR y) OR (x AND y))
with A=(x OR y), B=NOT A, C=(x AND y)
D=(NOT (x OR y) OR (x AND y)=B OR C, and
s(S5) E=NOT D

| x | y | A | B | C | D | E |
|---|---|---|---|---|---|---|
| 0 | 0 | 0 | 1 | 0 | 1 | 0 |
| 0 | 1 | 1 | 0 | 0 | 0 | 1 |
| 1 | 0 | 1 | 0 | 0 | 0 | 1 |
| 1 | 1 | 1 | 0 | 1 | 1 | 0 |

It is thus verified that s(S5)=E is identical to s(XOR).

It shall be observed that the sequence automatically selected to replace the XOR operator is made up of five elementary operations whose signature shall be significantly different from the XOR operator. Thus, it is possible to embody the simplest variant for implementing the method of the invention.

According to one optional, but extremely advantageous, characteristic of the invention used in the embodiment described here, the sequence of replacement operations, namely the set ES constituted by the eight sequences S1 to S8 given above. Thus, the difficulty of identification of the XOR operator is further increased by the multiple changes of the sequence of operations replacing the XOR operator during execution of the program, the sequences S1 to S8 able to be used having all different signatures.

According to another optional characteristic of the invention, but also extremely advantageous, used in the embodiment described here, the order number NDO=i (i ranging from 1 to 8) in its entirety (S1 to S8) of the sequence Si selected to be executed is determined according to certain parameters of the program currently being executed and/or of a random parameter. Advantageously, said random parameter is obtained from a pseudo-random numbers generator. This mechanism for scrambling sequences rendering random the sequence effectively selected to replace the XOR operator on each call proves to be extremely effective, especially in an encryption/decryption processing when the XOR operator is called several times in the program.

As shown on FIG. 2, the XORSEC routine comprises four main processing phases, namely in the order of execution:
a start or initialization phase IN-XORSEC with in particular the storing of the program counter values, and the operands OP1 and OP2,
a phase CAL-NDO for determining by calculation the order number NDO=i (i ranging from 1 to 8) of the sequence of operations Si to be executed to replace the instruction XOR with branching towards the corresponding sub-routine CAL-XORSEC(i) and present in the set CAL-XORSEC of eight sub-routines CAL-XORSEC(1) to CAL-XORSEC(8),
a phase CAL-XORSEC(i) for executing the sub-routine CAL-XORSEC(i) by logic calculation with the operands OP1 and OP2 of the sequence of operations Si selected by the phase CAL_NDO,
a phase OUT-XORSEC for return to the main program so as to resume its execution and transfer of the results of the CAL-XORSEC(i) equivalent to the calculation of an XOR between the two operands OP1 and OP2.

It shall be noted that for the phase CAL-NDO, the random generator GNPA 24 supplies on demand one random octet R used as a calculation parameter alone or with other parameters extracted from the values of the operands OP1 and OP2, the final result of the calculation being one octet F(R). By using for example an operation of the type NOD=i=F(R) AND 07h, the three less significant bits are extracted from this octet so as to obtain the binary value of NOD=i (from 000 to 111 namely 00h to 07h), order number of the sequence Si to be executed. It is to be noted that the value of the order number is a sensitive data element of the algorithm in question.

Finally, the routine XORSEC exhibits a further improved variant as regards the difficulty of identification in which the series of replacement sequences is constituted by sequences with a given period of execution (and owing to this more difficult to distinguish). So as to achieve this, certain sequences comprise at least one non-operative instruction designed to introduce a delay time in the execution of the sequences concerned. In particular, the non-operative instruction is selected from non-operative instructions in relation to the microprocessor or from normally operative instructions but rendered ineffective via their positions in the sequence of operations.

If it is assumed that the elementary operations AND, OR and NOT have approximately equal periods of execution (for example 4 cycle times of the clock of the central unit CPU 11), as for the non-operative <<blank>> operation NOP, the set ES of the sequences S1 to S8 is modified into a new set of sequences made uniform to 9 operations ES' being written by way of non-restrictive example as follows (and in which the added operations appear in thick type):

S'1=(x OR NOP y OR y) AND NOP NOT (x AND NOP y AND y)
S'2=(x OR y NOP OR y) AND NOP (NOT x OR NOP NOT y)

S'3=NOT (NOT x AND NOP NOT y) AND NOT (x AND y AND y)
S'4=NOT (NOT x AND NOP NOT y) AND (NOT x OR NOT y)
S'5=NOT (NOT (x NOP OR y OR y) OR (x NOP AND y AND y))
S'6=NOT ((NOT x AND NOT y NOP) OR (x AND y NOP AND y))
S'7=NOT ((NOT x AND NOT y) OR NOT (NOT x OR NOT y))
S'8=NOT (NOT (x OR y OR y) OR NOT (NOT x OR NOT y))

For example, for the sequence S'5:
S'5=NOT (NOT (x NOP OR y OR y) OR (x NOP AND y AND y)) with x'=x NOP, A=(x' OR y), A'=A OR y, B=NOT A', C=(x' AND y), C'=C AND y, D=B OR C'
and s(S'5) E=NOT D It is possible to write the truth table of the sequence S'5 which also verifies s(S'5)=s(XOR)

| S'5 | | | | | | | | | |
|---|---|---|---|---|---|---|---|---|---|
| x | y | x' | A | A' | B | C | C' | D | E |
| 0 | 0 | 0 | 0 | 0 | 1 | 0 | 0 | 1 | 0 |
| 0 | 1 | 0 | 1 | 1 | 0 | 0 | 0 | 0 | 1 |
| 1 | 0 | 1 | 1 | 1 | 0 | 0 | 0 | 0 | 1 |
| 1 | 1 | 1 | 1 | 1 | 0 | 1 | 1 | 1 | 0 |

It shall be observed that for sequences with nine elementary operations, the machine time remains quite reasonable.

The invention is not limited to its application concerning the protection of logic operators, but is also applicable to protection of mathematical operators, such as one-digit adders, adders, subtractors or multipliers or functional circuits similar to logic or mathematical operators, such as combinatory circuits, especially multiplexers and/or demultiplexers, coders and/or decoders, generators and/or parity detectors or comparators.

For example, according to another application of the method of the invention, the operator to be protected is the mathematical operator of the <<multiplication by two>> obtained by shifting left one bit with resetting of the low order bit. In notation C ANSI, this operator is also denoted (x<<1).

Thus, on each call from the operator (x<<1), its execution shall be replaced by the execution of a sequence of operations selected from the following equivalent sequences:
S"1=(x ADD x)
S"2=(x AND F0h) ADD x ADD (x AND 0Fh)
S"3=(NOT ((NOT x) ADD (NOT x))) SUB 1
S"4=(y ADD x) SUB (y SUB x),
in which the operator ADD is the standard addition operator on one octet, the instruction SUB is the standard subtraction operator on one octet and the suffix <<h>> indicates a hexadecimal value. Generally speaking, the choice of the equivalent sequence S"i and its implementation are embodied similarly, sometimes identically, to what has been described in details as previously for the XOR operator.

It shall also be noted that, without departing from the context of the invention, the smart card accommodating the electronic module with a protected operator according to the invention can be replaced by any other embedded system.

One embodiment of the invention is shown below concerning its implementation using an electronic module. In the method for protecting a logic or mathematical operator, or a similar functional circuit able to be used in the execution of a program in the electronic module including a microprocessor and a memory, the execution of said operator by the microprocessor is replaced by the execution of a sequence of replacement operations whose final result is identical to that of the function of said operator, said result being stored in the memory. The electronic module with a protected operator and comprising at least one microprocessor and a memory storing a program to be executed comprising at least one logic or mathematical operator or similar functional circuit to be protected wherein it comprises means to replace execution of the operator with the aid of the microprocessor by the execution of a sequence of operations whose final result is identical to that of the function de the operator, said result being stored in the memory.

The invention claimed is:

1. A method for protecting a logic or mathematical operator or a similar functional circuit able to be used for executing a program in an electronic module with a processor, wherein during the execution of the program, the execution of said operator is replaced by the execution of a sequence of replacement operations whose final result is identical to that of the function of said operator.

2. The method according to claim 1, wherein said sequence of replacement operations is selected on each call for said operator from a set of equivalent sequences.

3. The method according to claim 2, wherein each sequence has associated an order number therewith and wherein the sequence of replacement operations is selected by selecting a particular order number corresponding to one sequence and wherein the selected order number is determined according to certain parameters of the program being executed and/or a random parameter obtained from a pseudo-random number generator.

4. The method according to claim 2, wherein certain sequences include at least one non-operative instruction intended for introducing a delay time in the execution of the sequences in question, said non-operative instruction being selected from non-operative instructions in relation to the microprocessor or from instructions which are normally operative but rendered ineffective via their positions in the sequence of operations.

5. The method according to claim 2, wherein at least one sequence of replacement operations is made up of elementary logic operators.

6. The method according to claim 5, wherein at least one sequence of replacement operations is made up of AND, OR and NOT elementary logic operators.

7. An electronic module, comprising:
at least one microprocessor and one program stored in memory of the electronic module and comprising instructions to be executed by the microprocessor; and
wherein the program contains at least one logic or mathematical operator or similar functional circuit to be protected when executed by the microprocessor;
the microprocessor being programmed with instructions causing the microprocessor while executing the one program to replace the execution of said operator by the execution of a sequence of operations whose final result is identical to that of the function of said operator or functional circuit.

8. The electronic module according to claim 7, wherein the microprocessor is further programmed with instructions to select said sequence of operations on each call of said operator from a set of equivalent sequences.

9. The electronic module according to claim 8, wherein each said sequence has associated an order number therewith and wherein the microprocessor is further programmed to select a sequence by selecting a particular order number according to certain parameters of the program being executed and/or a random parameter generated by a pseudo-random numbers generator.

10. A system comprising an electronic module having at least one microprocessor and one program to be executed by the microprocessor, wherein the program contains at least one logic or mathematical operator or similar functional circuit to be protected when executed by the microprocessor, wherein the microprocessor is programmed with instructions to cause the microprocessor while executing the program to replace the execution of said at least one logic or operator or execution using said functional circuit by the execution of a sequence of operations whose final result is identical to that of the function of said operator or said functional circuit.

11. The system according to claim 10, wherein the microprocessor is further programmed with instructions to select said sequence of operations on each call of said operator or functional circuit from a set of equivalent sequences.

12. The system according to claim 11, wherein each said sequence has associated an order number therewith and wherein the microprocessor is further programmed to select a sequence by selecting a particular order number according to certain parameters of the program being executed and/or a random parameter generated by a pseudo-random numbers generator.

* * * * *